United States Patent [19]
Younkin

[11] 4,370,815
[45] Feb. 1, 1983

[54] NAVIGATION INSTRUMENT
[75] Inventor: James R. Younkin, Springdale, Ark.
[73] Assignee: Edo-Aire Mitchell, Mineral Wells, Tex.
[21] Appl. No.: 246,309
[22] Filed: Mar. 23, 1981
[51] Int. Cl.³ ............................................. G01C 19/34
[52] U.S. Cl. ....................................... 33/318; 33/324; 340/27 NA
[58] Field of Search ............... 33/1 PT, 318, 322, 324, 33/325, 349; 340/27 NA

[56] References Cited
U.S. PATENT DOCUMENTS

| | | | |
|---|---|---|---|
| 2,360,399 | 10/1944 | Chandler | 33/204 |
| 2,406,341 | 8/1946 | Beach et al. | 33/318 |
| 2,704,457 | 3/1955 | Gabrielson et al. | 33/318 |
| 2,704,457 | 3/1955 | Gabrielson et al. | 74/5.6 |
| 2,796,594 | 6/1957 | Chombard | 340/27 |
| 2,892,180 | 6/1959 | Smith | 33/322 |
| 2,998,600 | 8/1961 | Majendie | 340/27 NA |
| 3,091,127 | 5/1963 | Depp | 74/5 |
| 3,455,030 | 7/1969 | Owens et al. | 33/204 |
| 3,806,865 | 4/1974 | Stephan et al. | 33/318 |
| 3,849,896 | 11/1974 | Younkin | 33/318 |
| 3,883,957 | 5/1975 | Younkin | 33/318 |
| 3,889,387 | 6/1975 | Owens et al. | 33/318 |

*Primary Examiner*—Richard R. Stearns
*Attorney, Agent, or Firm*—Richards, Harris & Medlock

[57] ABSTRACT

A horizontal situation indicator having a heading card direct-driven by a directional gyro is provided. Relative positioning of the heading card and one or more navigation indicators is determined by sensing an electrical differential between a transducer associated with a heading card and a transducer associated with each navigation indicator. Spring-loaded clutch mechanisms are provided to allow adjustment of the navigation indicators without applying a torque to the heading card and gyro.

17 Claims, 11 Drawing Figures

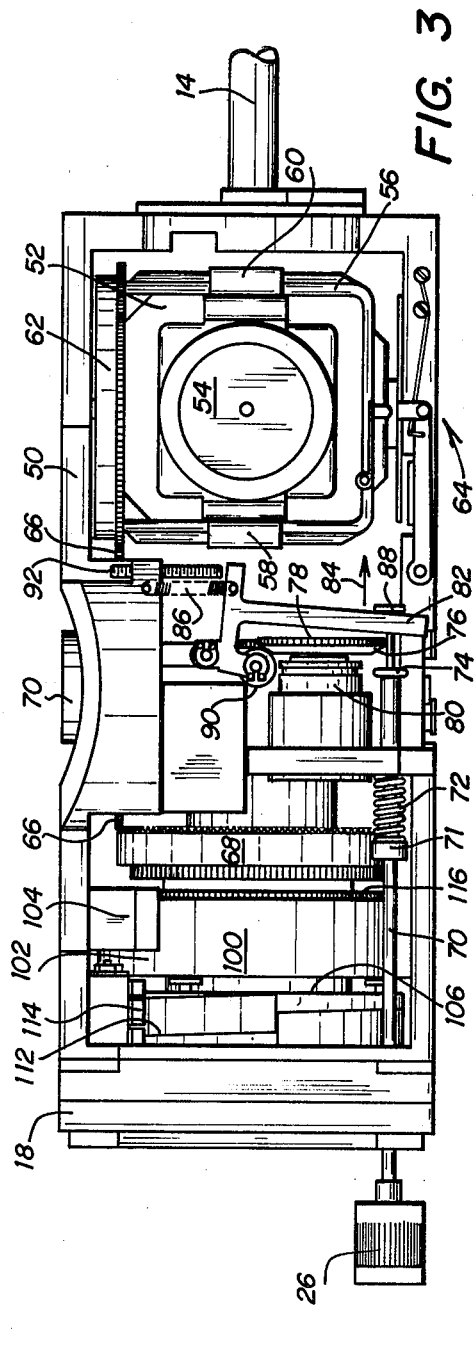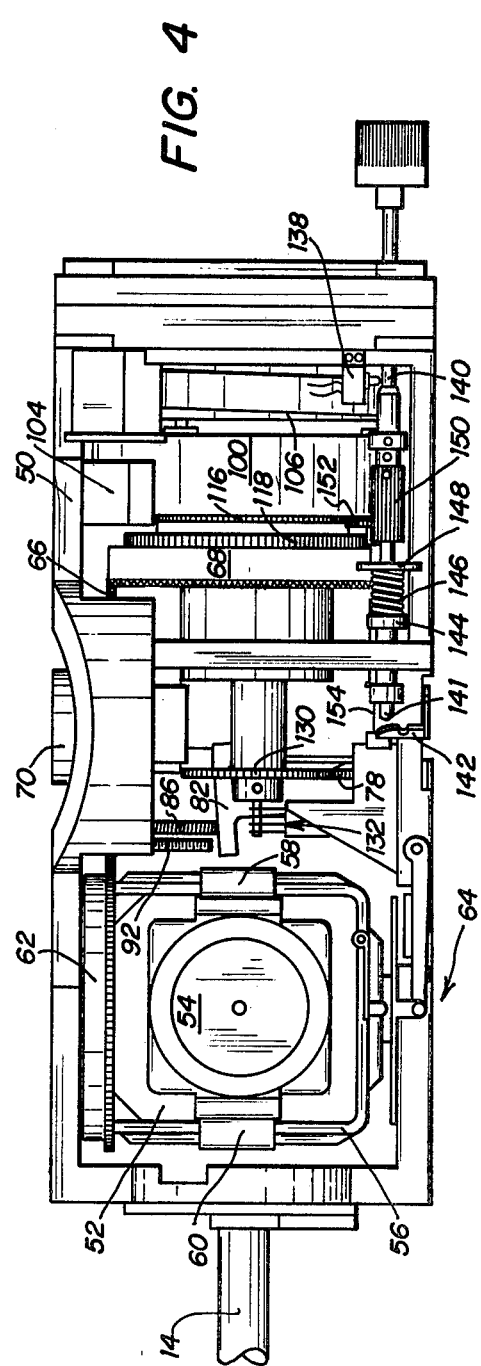

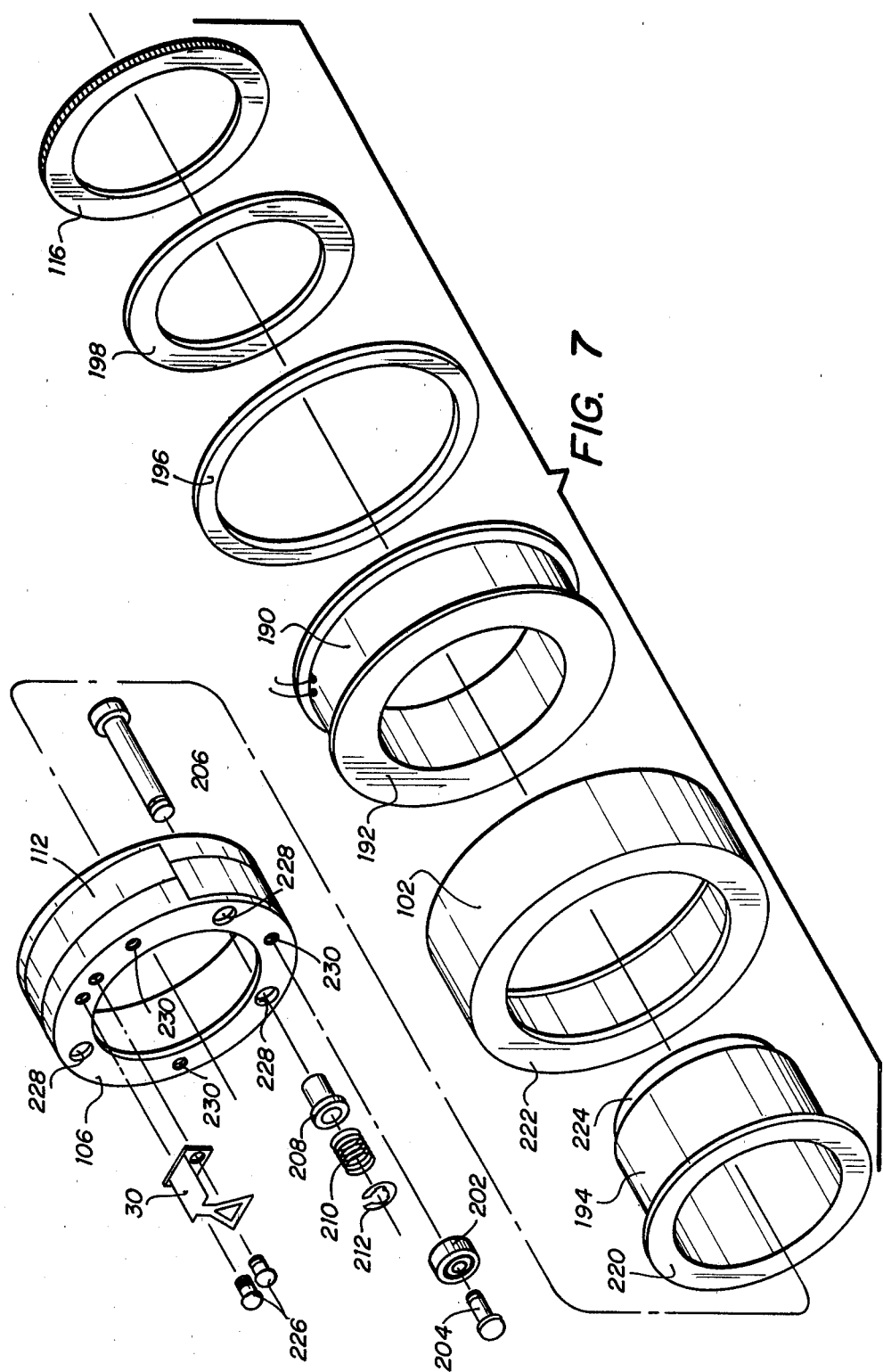

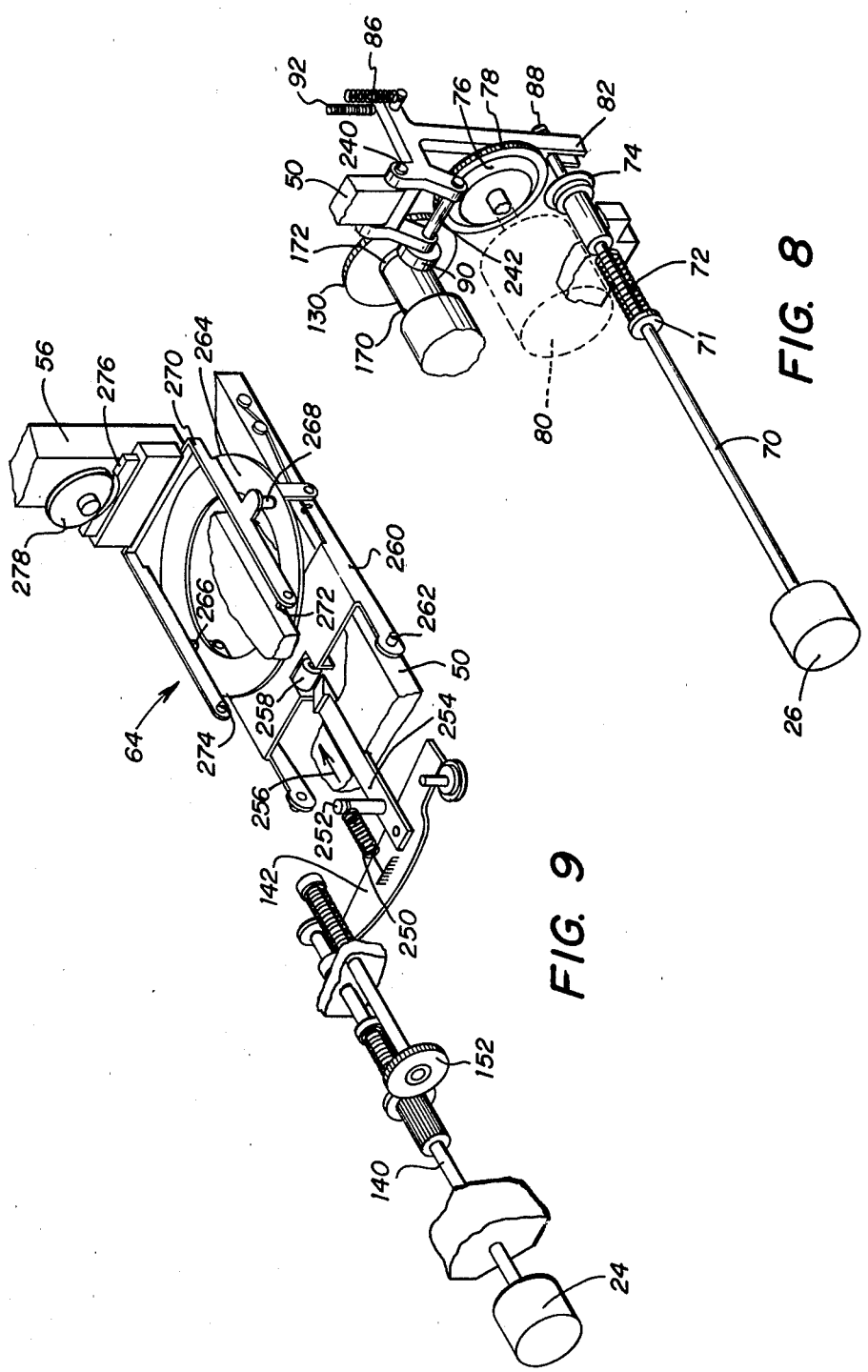

NAVIGATION INSTRUMENT

TECHNICAL FIELD

This invention relates to a navigation instrument for aircraft, and more particularly to a direct-drive horizontal situation indicator having a plurality of indicators where each indicator has a transducer associated therewith to generate an electrical signal, and relative positioning between the elements is determined by means responsive to the differential between the transducer outputs.

BACKGROUND ART

An aircraft pilot utilizes instrumentation to assist in the understanding of flight situations at any instant. Instrumentation systems are available and provide compact integrated displays which portray the horizontal situation of an aircraft in any one of several available modes. It is also desirable to generate autopilot heading command signals in horizontal situation indicators of the type just described for aircraft control. It is further desirable to incorporate radio-generated horizontal situation indication when radio navigation in either the localizer mode or omni mode is selected.

An instrument display of the type to which the present invention is directed indicates several distinct kinds of information to the pilot, each of which will be described now in more detail.

A heading card is provided to indicate aircraft heading. The card is in the form of a flat ring suitably scaled in a compass format on the face thereof. Provision is made for synchronous rotation of the heading card with a directional gyro. The heading card rotates with respect to a fixed lubber line to indicate the present compass heading of the aircraft.

The heading card cooperates with a heading marker to provide for selection of the desired aircraft heading in the heading mode. The heading marker is movable relative to the card for selecting a desired autopilot command heading.

Centered in the heading card is a radio display which provides an indication of the horizontal situation generated from a radio navigation instrument. A meter movement is responsive to deviation from the radio path and thus indicates such displacement to the pilot. Movement of the meter needle across the face of the radio display indicates the extent of the displacement from the radio path. The meter needle forms the center portion of an arrow-shaped indicator (omni needle) which extends across the face of the heading card. Like the heading marker, the omni needle is movable relative to the card for selecting a desired omni bearing.

Directional gyros of the type used in aircraft instrumentation are sensitive to torques applied from external sources. Such torques must be minimized in order to avoid "spilling" the gyro. A directional gyro is spilled when a torque applied to the outer gimbal causes precession of the inner gimbal until it hits a stop. The outer gimbal then moves in an uncontrolled manner and the instrument ceases to function as a gyro.

A major source of external torque in prior art systems has been the means employed to generate an indication of the relative positionings between the heading card and heading marker (center section) or omni needle. In many prior art systems mechanical differentials have been employed to generate these signals. Such mechanical differentials have one shaft connected to the heading card and a shaft connected to the center section. When there is relative motion between the heading card and the center section an output develops from the differential. All such mechanical differentials apply some torque to the heading card when in operation.

Prior art systems have used various means for coupling the directional gyro to the heading card and isolating the gyro from the torques described above. For example, a gyro, remotely located from the instrument panel, generates an electrical signal that is applied to a servo indicator driving a heading card.

Another technique has been to mechanically isolate the gyro from the heading card system and provide a feedback-controlled servo system to couple the heading card and the gyro. A tracking disk is rotatably mounted on the vertical outer gimbal axis of the gyro with a pickoff for detecting the angular displacement between the tracking disk and the outer gimbal. The pickoff and tracking disk are configured such that relative rotation may occur with relatively low friction. A transmission means couples the disk and the heading card for equal rotation, and a servomotor drive for the transmission means slaves the disk to the gyro in response to an error signal from the pickoff. Such a disk system is disclosed in U.S. Pat. No. 3,849,896 entitled "Directional Gyro Indicator System."

In the system just described, the servo and transmission means which rotate the card can withstand torques applied thereto by the mechanical differentials. The pickoff and tracking disk system generates an electrical signal to operate the servo, and thus external torques are not applied directly to the gyro.

Although a system such as the one described above is the best device currently available, it is less than ideal in several respects. The transmission system and the tracking disk/pickoff system are relatively complex and difficult to arrange in the required small package. This complexity increases the cost of manufacture, because the system requires careful alignment of many cooperating parts. The complexity and associated high cost is directly caused by the need to provide mechanical isolation of the gyro from mechanical torques.

Thus, it can be seen that a need has arisen for a horizontal situation indicator which is simple in operation and construction yet which allows isolation of the directional gyro from external torques.

DISCLOSURE OF THE INVENTION

The present invention is directed toward a horizontal situation indicator which includes an aircraft heading card fixed in a frame for rotation about a generally horizontal main axis. A direction gyro is supported in the frame behind the heading card having an outer gimbal disposed on a vertical axis. The heading card is directly coupled to the gyro by a direct-drive transmission, such that the heading card synchronously rotates with the gyro in a one-to-one relationship. A heading transducer coupled to the direct-drive transmission generates a signal which varies with the position of the heading card relative to the frame.

The invention further includes a navigation indicator, for example, an omni needle, fixed in the frame for rotation about the main axis. A clutch for coupling the navigation indicator to the heading card for co-rotation is provided. A navigation transducer generates a signal varying with the position of the navigation indicator relative to the frame. A positioning of the navigation indicator relative to the heading card may be determined by sensing a differential between the heading transducer signal and the navigation indicator transducer signal. The clutch which couples the heading card and the navigation indicator may be disengaged by a navigation course selector to allow relative low-friction rotation between the heading card and the navigation indicator.

The utilization of the electrical differential principle enables the direct-drive principle to be employed. As previously described, in some prior art systems an electro/mechanical differential was employed to sense the relative positioning of the omni needle and heading card. The necessity to avoid applying spilling torques to the gyro precluded the use of direct-drive. The two-transducer low-friction electrical differential device of the present invention thus enables the direct-drive feature.

BRIEF DESCRIPTION OF THE DRAWINGS

A more complete understanding of the invention and its advantages will be apparent from the following detailed description taken in conjunction with the accompanying drawings in which:

FIG. 3 is a left-side view of the navigation instrument of FIG. 1, with the case removed;

FIG. 4 is a right-side view of the navigation instrument of FIG. 1;

FIG. 7 is an exploded view of the heading marker assembly;

FIG. 8 is a view of the omni bearing selector mechanism;

FIG. 9 is a view of the heading marker selector mechanism; and

DETAILED DESCRIPTION

Figures 1, 2:
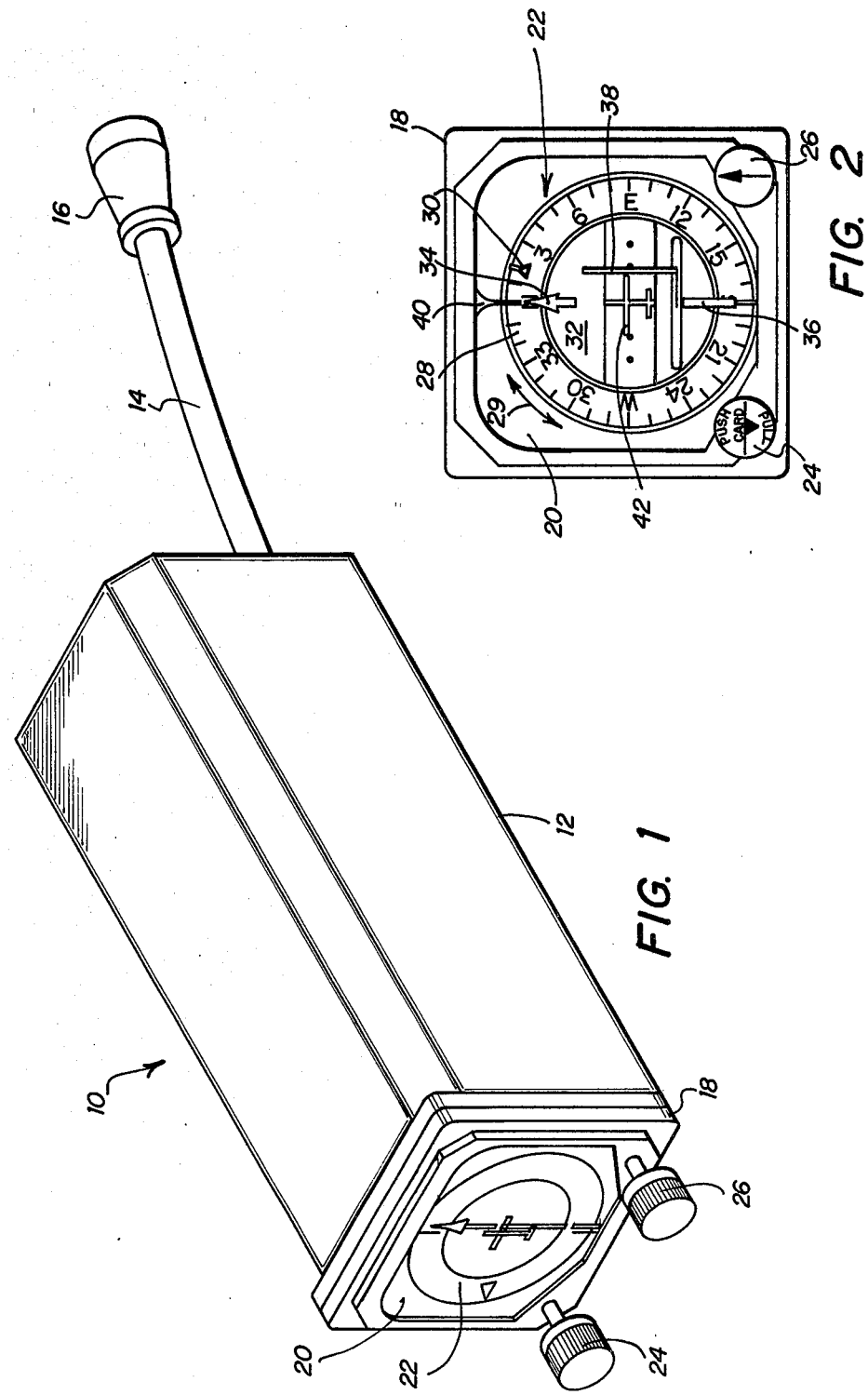
FIG. 1 is a perspective view of a navigation instrument constructed in accordance with the invention.
FIG. 2 is a front view of the navigation instrument of FIG. 1.

Referring initially to FIG. 1, a horizontal situation indicator (hereinafter "HSI") comprising the present invention has been illustrated and is indicated generally by the numeral 10. Housing 12 encloses the inner workings of HSI 10 which will be described in detail below. Cable 14 and connector 16 are provided to connect HSI 10 to the electrical system of the aircraft. Housing 12 may be adapted to fit into a 3"×3" opening in an aircraft instument panel.

At the front of the instrument, face ring 18 encloses window 20 which provides a view of face 22 of the instrument. Knobs 24 and 26 are provided to adjust HSI 10 as will be described in more detail below.

Referring now to FIG. 2, face 22 of HSI 10 has been illustrated. The display presented in face 22 is conventional and well-known. Prominent on face 22 is heading card 28 in the form of a flat ring. The card is adapted to be rotated as indicated by arrow 29. Heading card 28 is marked with legends N, E, S and W, the four points of the compass, and there is a scale similar to a compass with 10 degree points so marked.

A heading marker 30 is mounted adjacent the periphery of card 28. As will be described, marker 30 is mounted on structure permitting it to be rotated with card 28 in the normal situation or to be selectively rotated relative to card 28 during adjustment.

A radio display unit 32 centered in card 28 is similarly rotatable with card 28 in the normal situation or relative to card 28 during adjustment. The radio display unit 32 comprises a central disk which carries upper and lower pointers 34 and 36 which form an omni needle. Pointers 34 and 36 are aligned and serve to provide an indication of a selected radio-controlled course. A meter movement is provided to support and control the position of center segment 38. When the segment 38 is in alignment with pointers 34 and 36, and the aircraft is in the omni mode or the localizer mode, the aircraft is flying directly along the radio-defined path. When the aircraft is displaced from the radio-defined path, segment 38 is displaced to the right or to the left of the center of the radio display in an amount dependent upon the extent of the aircraft displacement from the path.

Lubber line 40 and miniature aircraft 42 are fixed to face ring 18 to provide an indication of current aircraft heading. Thus, in the situation depicted in FIG. 2, face 22 indicates a northerly heading.

Knob 24 provides two separate adjustments. Knob 24 may be used to set the heading marker relative to the heading card by pulling the knob away from the face of the instrument and rotating the knob. Applying a pushing force to the knob while rotating it rotates heading card 28 together with heading marker 30.

In accordance with the first adjustment, when marker 30 is moved relative the heading card away from a lubber line 40, the instrument generates a signal varying with the angular difference between the heading marker and the lubber line which causes an associated autopilot system to bank and turn the aircraft until it flies the direction indicated by the position of marker 30 on heading card 28. This results in marker 30 being aligned with lubber line 40.

In accordance with the second adjustment, the unit may be set to correspond with a compass heading during initial start-up of the aircraft or to correct an erroneous reading in-flight.

Knob 26 is pushed and rotated to set the omni needle, that is, to cause pointer 34 to register on the scale carried by the heading card 28 the desired course of the radio-defined path. For example, in the localizer mode, pointer 34 would then be set to the runway heading. The aircraft would then be caused to fly to and then along the localizer radio beam such that there is no offset or displacement in the segment 38 relative to pointers 34 and 36.

The system for accomplishing the foregoing functions is illustrated in FIGS. 3–10.

Referring now to FIG. 3, frame 50 is generally rectangular in shape and supports at the rear thereof a directional gyro assembly 52. Gyro assembly 52 in this embodiment is an air-driven gyro having gyro element 54 mounted for horizontal rotation in outer gimbal 56 on bearings 58 and 60. Gimbal 56 is mounted for vertical rotation in frame 50 and includes drive gear 62 mounted at the top thereof. Gyro assembly 52 has a caging mechanism 64 associated therewith which is described in more detail in connection with FIG. 9. The vertical output axis of gyro assembly 52 is applied through drive gear 62 and idler gear 66 to driven gear 68. Idler gear 66 includes hub 70. Driven gear 68 is a crown gear and rotates the heading card in a direct one-to-one relationship with the rotation of gyro assembly 52 about its vertical axis.

Knob 26 is attached to shaft 70 which, as described above, is used to set a radio-defined course. Shaft 70 is biased toward the front of the instrument by retainer 71 and spring 72 which bears against frame 50. Resilient drive ring 74 is attached to shaft 70 and is positioned to contact surface 76 of transducer gear 78 when knob 26 is pushed in. Transducer gear 78 is attached at its center to omni transducer 80. The omni bearing selector mechanism is described in more detail in connection with FIG. 8.

Fixed for rotation in frame 50 is arm 82 which is biased to rotate in the direction of arrow 84 by spring 86. Stop 88 on shaft 70 restrains arm 82 but allows rotation of shaft 70 when knob 26 is depressed. Also attached to arm 82 is bearing 90. The travel of arm 82 is limited and may be adjusted by screw 92.

Also shown in FIG. 3 is heading marker assembly 100. Outside pole piece 102 is rigidly attached to frame 50 by bracket 104. Indicator sleeve 112 is attached to carrier 106 and changes positions relative to coil assembly 114 as carrier 106 rotates. Heading marker assembly 100 also includes marker gear 116. Heading marker assembly 100 is described in more detail in connection with FIGS. 6 and 7.

Referring now to FIG. 4, the system of the present invention is shown in a second side view. Transducer gear 78 engages omni gear 130. Omni gear 130 is attached to radio display unit 32 as will be described below in connection with FIG. 6. A wiper and slip ring assembly 132 is provided to convey electrical signals to radio display unit 32.

Switch 138 is fixed in the frame adjacent shaft 140. Knob 24 is attached to shaft 140 which at its furthest end contacts arm 142, an element in caging mechanism 64. Disposed on shaft 140 are stop 144, spring 146, disk 148 and drive gear 150. Drive gear 150 meshes with idler gear 152 mounted on idler shaft 154. Idler gear 152 is slidably mounted and may mesh with either marker gear 116 or barrel gear 118, an integral part of driven gear 68. Shafts 142 and 154, and their associated components, are described in more detail in connection with FIGS. 9, 10A and 10B.

Figure 5:
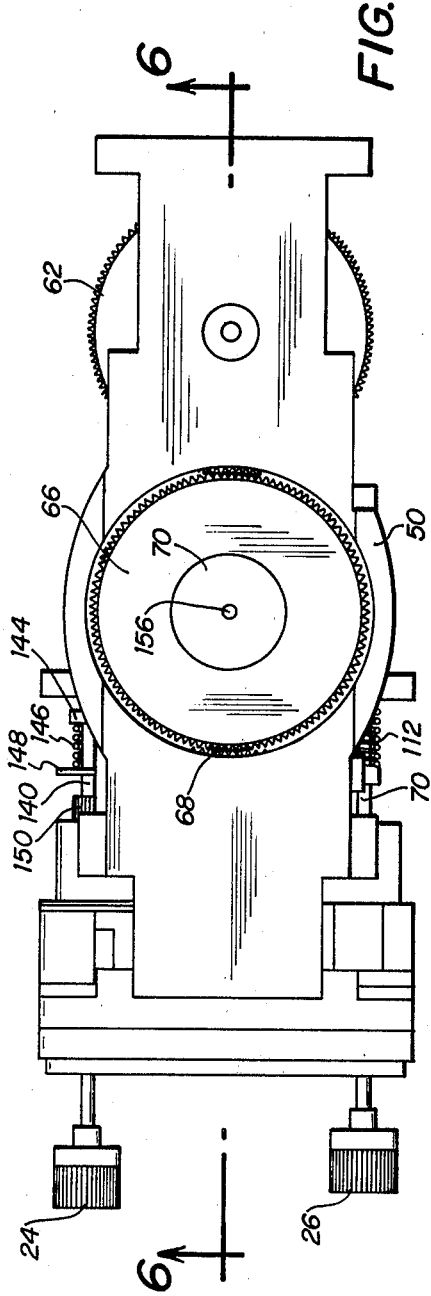
FIG. 5 is a top view.

Referring now to FIG. 5, a top view of HSI 10, it can be readily appreciated that drive gear 62, attached to the gyro outer gimbal, directly meshes with idler gear 66. Idler gear 66 meshes also with driven gear 68. Gears 62, 66 and 68 have identical pitch diameters such that a one-to-one rotation relationship is established. Thus it can be seen that through the drive train composed of gears 62, 66 and 68, heading card 28 turns in a one-to-one relationship with gyro assembly 52 through direct-drive gear means.

Figure 6:
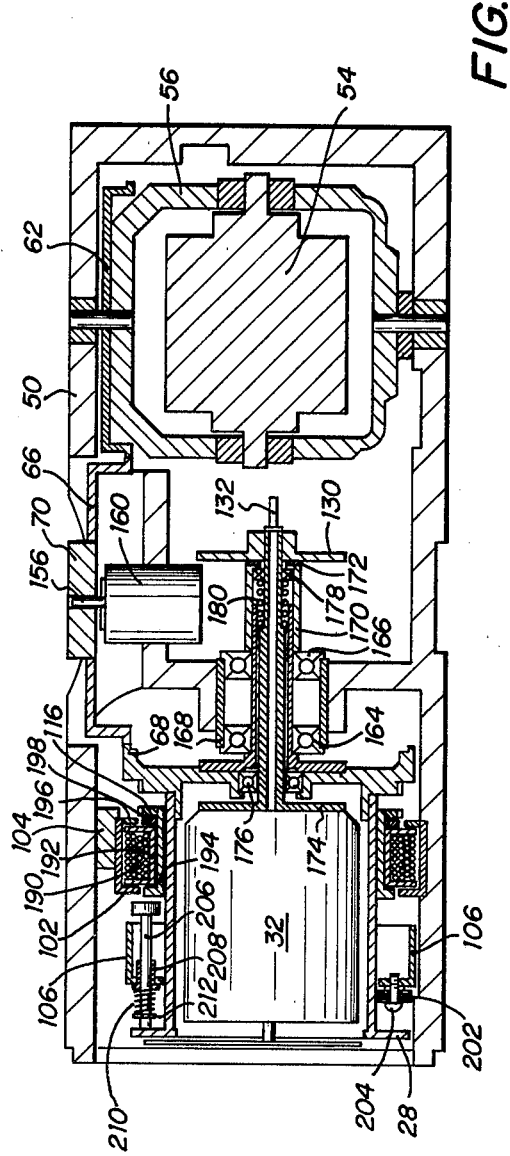
FIG. 6 is a cross-sectional view taken along the line 6—6 of FIG. 5.

Referring now to FIG. 6, a cross-sectional view of HSI 10, idler gear 66 and hub 70 are connected to shaft 156. Shaft 156 is directly connected to heading transducer 160 fixed in frame 50. As clearly shown in FIG. 6, heading card 28 is a barrel-shaped member extending from the front of the instrument to driven gear 68. Driven gear 68 is attached to heading card shaft 162 which is supported by ball bearings 164 and 166. Sleeve 168 fixes the bearings in frame 50. Rigidly connected to heading card shaft 162 is clutch shaft 170, a hollow member having a flat disk-like area at its furthest end. Disposed between clutch shaft 170 and omni gear 130 is clutch disk 172. Omni gear 130 is rigidly connected to omni shaft 174, a hollow member which at its front end is attached to radio display unit 32. Omni shaft 174 is supported within heading card shaft 162 by ball bearing 176 and bushing 178. Compression spring 180 bears against a shoulder formed on omni shaft 154 and bushing 178 in order to urge omni gear 130 against clutch disk 172 and heading card shaft 170. Thus, radio display unit 32, omni shaft 174, and omni gear 130 rotate in unison with heading card 28 and heading card shaft 170 in the absence of outside forces.

Heading marker assembly 100 is shown in more detail in FIG. 6. Outside pole piece 102 encloses coil 190 which is wrapped around form 192. Inside pole piece 194 is supported for rotation within coil 190 and outside pole piece 102, and is rigidly connected to marker gear 116. Outside pole ring 196 and inside pole ring 198 are pressed onto outside pole piece 102 and inside pole piece 194 respectively.

As will be described in more detail in connection with FIG. 7, carrier 106 is supported around heading card 28 by three ball bearings 202, two of which are not shown. Ball bearings 202 are disposed 120° apart on carrier 106 and attached thereto by screws 204. Also disposed on carrier 106 is pin 206 within pin guide 208. Pin 206 is urged frontwardly against heading card 28 by spring 210 which bears against pin guide 208 and retainer ring 212. Pin 206 has a flattened and widened face at its end. Pin 206, pin guide 208, spring 210 and retainer ring 212 are provided in triplicate, spaced 120° apart upon carrier 106.

Referring now to FIG. 7, the construction of heading marker assembly 100 may be understood in still further detail. Inside pole piece 194 has front surface 220, and outside pole piece 102 has front surface 222. When heading marker assembly 100 is assembled, front surface 220 is positioned slightly forward of surface 222. Marker gear 116 is pressed on mating surface 224 of inside pole piece 194. Heading marker 30 is attached to carrier 106 by screws 226. Pin guides 208 are bonded in carrier 106 within holes 228. Screws 204 pass through ball bearings 202 and mate with threaded holes 230. Indicator sleeve 112 is mounted to the exterior perimeter of carrier 106.

Referring now to FIG. 8, further detail and operation of the omni bearing selector mechanism may be appreciated. Arm 82 is pivoted within frame 50 on shaft 240. Bearing 90 is supported in arm 82 by shaft 242. In the normal situation, spring 72 biases shaft 70 and the knob 26 forward such that stop 88 contacts arm 82. Thus, in the normal situation, arm 82 is pivoted forwardly and bearing 90 is spaced apart from omni gear 130. Likewise, resilient ring 74 is spaced apart from surface 76 on transducer gear 78. It is necessary to make adjustments to the radio display unit without transmitting a torque back to the gyro unit. In the direct-drive system of the present invention, the radio display unit must therefore be in a low friction state relative the heading card before adjustment torque is applied. This is accomplished by disengaging the friction clutch between clutch shaft 170 and omni gear 130. When knob 26 and shaft 70 are depressed, stop 88 moves rearwardly and allows arm 82 to pivot, being urged by tension spring 82. Ball bearing 90 contacts omni gear 130 and applies a pressure thereto in order to release clutch disk 172 between clutch shaft 170 and omni gear 130. At the same time, resilient ring 74 comes into contact with surface 76 on transducer gear 78. Twisting knob 26 then applies a torque to transducer gear 78 which is transmited to omni gear 130.

Thus it can be seen that in the normal situation, the radio display unit and the heading card rotate together because a high friction state exists between omni gear 130 and clutch shaft 170. However, if knob 26 is depressed a sufficient distance to allow bearing 90 to act upon omni gear 130, a low friction state is achieved, and omni gear 130 may be rotated relative to clutch 170 without imparting a substantial torque to clutch shaft 170, which is ultimately connected to the gyro assembly 52. With this configuration, the clutch is decoupled and a low friction state is achieved before resilient ring 74 comes into contact with transducer gear 78. Thus, under no circumstances can a torque applied to knob 26 be transmitted to the heading card or gyro.

Omni transducer 80 is directly coupled to the radio display unit through omni gear 130 and transducer gear 78. The signal generated by omni transducer 80 is representative of the angular positioning of upper and lower pointers 34 and 36 relative to the frame. Referring again to FIG. 6, heading transducer 160 is directly coupled to the heading card and provides a signal which is representative of the position of the heading card relative to the frame. Transducers 80 and 160, being directly coupled to the gyro, are necessarily low-friction devices. The positioning of the omni needle relative the heading card may be determined by detecting the differential between the signals produced by transducers 80 and 160.

Referring now to FIG. 9, an operation of the card-setting and gyro-caging mechanisms may be understood. As described above, it is necessary to set HSI 10 initially so that the heading card indicates the proper compass heading. During this adjustment, it is necessary to apply a torque to the gyro and turn the heading card and gyro together until the the heading reading matches the compass reading. Caging mechanism 64 holds the gyro in a horizontal position during this procedure. In the normal situation, tension spring 250 urges post 252 on arm 154 frontwardly. Arm 254 is slidably mounted in frame 50. When knob 24 is depressed, however, shaft 140 contacts arm 142 and arm 254 is moved in the direction of arrow 256. Arm 254 is inclined at its furthest end and lifts up roller 258 in bracket 260. Bracket 260 is pivotally connected at pivot 262 to frame 50. As bracket 260 pivots, ring 264 is lifted upwardly to contact points 266 and 268 on arm 270. Arm 270 is pivotally attached to the outer gimbal of the gyro. Also attached to arm 270 is block 276. Block 276 when raised contacts eccentric 278 which is attached to the horizontal axis of the gyro element. Eccentric 278 has its smallest diameter disposed such that the gyroscope is held in a horizontal position when block 276 contacts it. With the gyroscope caged in this manner, the gyroscope may be rotated in the initial setting function or to adjust the heading setting without precession.

Figure 10A:
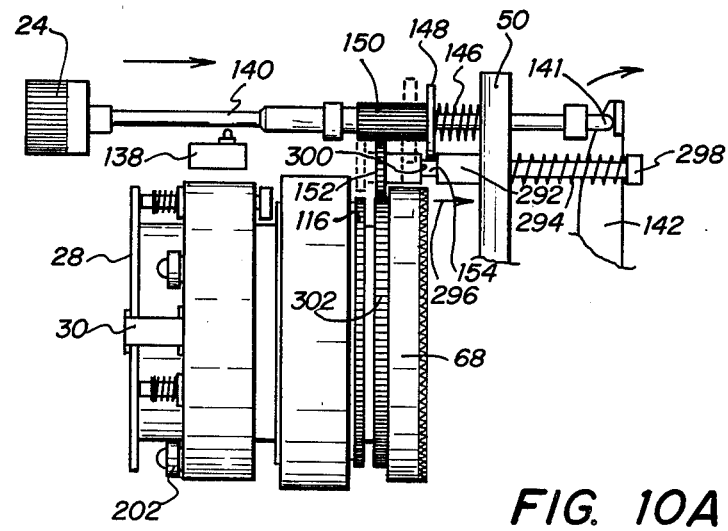
FIGS. 10A and 10B are top views of the heading marker selector system of FIG. 9.

Referring now to FIG. 10A, the mechanism for applying torque to the heading card and gyro during the setting operation just described may be further appreciated. FIG. 10A shows knob 24 and shaft 140 being fully depressed. Shaft 140 is in full contact with arm 142. Idler gear 152 is mounted on idler shaft 154 which is slidably attached to frame 50 through sleeve 292. Compression spring 294 urges idler gear 152 and idler shaft 154 in the direction of arrow 296, being contained by stop 298. Idler gear 152 has shoulder 300 formed on its rearwardmost end. Disk 148, slidably mounted on shaft 140 and urged in the direction of drive gear 150 by compression spring 146, is dimensioned to contact shoulder 300. When shaft 140 and knob 24 are depressed, however, gear 150 is moved rearward enough to contact disk 148 and take disk 148 out of contact with shoulder 300, thus allowing idler gear 152 to move in the direction of arrow 296 and mesh with barrel gear 118. Thus, when knob 24 and shaft 140 are depressed, the gyroscope is caged, and a torque may be applied to barrel gear 118 to rotate the entire heading card and gyroscope combination.

In the normal situation, with knob 24 and shaft 140 not depressed, disk 148 and idler gear 152 occupy positions as indicated by phantom lines in FIG. 10A. It will be appreciated that in this position, torque applied to knob 24 will not be applied to barrel gear 118 since idler gear 152 and barrel gear 118 are not meshing.

Figure 10B:
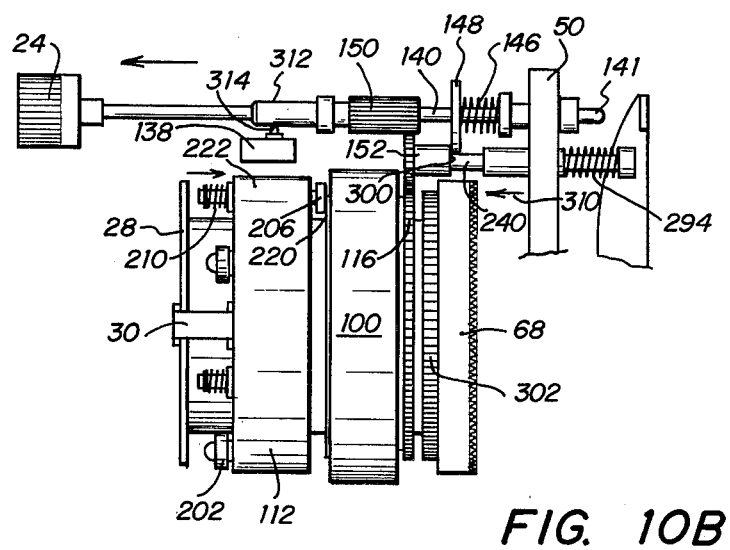

Referring now to FIG. 10B, the mechanism for setting the heading marker relative the heading card may be appreciated. When knob 24 and shaft 140 are pulled in a direction away from the instrument, disk 148 contacts shoulder 300 of idler gear 152. Spring 146 is stronger than spring 294, so idler gear 152 and idler shaft 154 move in the direction of arrow 310 until idler gear 152 meshes with marker gear 116. At the same time, cylinder 312 on shaft 140 contacts button 314 on switch 138. Switch 138 is thereby closed, and power is applied to coil 190 in heading marker assembly 100. Coil 190, when energized, creates a magnetic field which overcomes springs 210 and pulls pins 206 into contact with front surface 220 of inside pole piece 194. As knob 24 is rotated, torque is applied through idler gear 152 to marker gear 116 and inside pole piece 194. Pins 206, being in contact with inside pole piece 194, cause carrier 106 to be rotated and heading marker 30 is thereby moved relative to heading card 28. Because pins 210 are withdrawn from contact with the backside of heading card 28, carrier 106 rotates relative to heading card 28 in a low friction state, being supported by ball bearings 202.

Thus, two friction states exist with respect to the heading marker assembly. When switch 138 is open (the normal situation) a high friction relationship exists between carrier 106 and heading card 28 and heading marker 30 rotates with heading card 28. However, when knob 24 is pulled out and switch 138 is closed, a low friction relationship exists due to pins 206 being pulled away from heading marker 28. In this situation, heading marker 30 can be moved relative heading card 28 without imparting a substantial torque to heading card 28 and therefore to the gyro. Thus, it can be seen that pins 206 are the operative members of a spring-loaded friction clutch.

Indicator sleeve 112 in conjunction with coil assembly 114 is a low-friction transducer which generates a signal representative of the position of heading marker 30 relative the frame. The relative position of heading marker 30 and heading card 28 may thus be determined by detecting the electrical differential between the signals generated by coil assembly 114 and heading transducer 160. As in the case of the radio display unit, the utilization of the low-friction electrical differential principle allows the direct-drive transmission principle to be employed between the heading card and the gyroscope.

While only one embodiment of the present invention has been described in detail herein and shown in the accompanying drawings, it will be evident that various further modifications are possible without departing from the scope of the invention.

I claim:

1. An aircraft instrument for generating navigation information comprising:
   a first element;
   means for coupling said first element to a gyro to be driven thereby;
   first transducer means for generating a signal representative of the position of said first element relative to a reference;
   a second element;
   means for coupling said second element to said first element for co-movement therewith, said means for coupling including means for de-coupling and relatively rotating said second element with reference to said first element;
   second transducer means for generating a signal representative of the position of said second element relative to said reference; and
   means for generating a signal varying with the differential between said first and second transducer means signals and varying with the relative position of said first and second elements.

2. The aircraft instrument of claim 1 wherein said first element is an aircraft heading card and said second element is an omni needle, and wherein said means for coupling includes means for positioning said omni needle relative to said aircraft heading card to select an omni bearing.

3. The aircraft instrument of claim 1 wherein said first element is an aircraft heading card and said second element is a navigation indicator, and wherein said means for coupling includes means for positioning said navigation indicator relative to said aircraft heading card to select a navigation course.

4. The aircraft instrument of claim 1 further comprising:
   a third element;
   means for coupling said third element to said first element for co-movement therewith, said means for coupling said third element including means for de-coupling and relatively rotating said third element with reference to said first element; and
   third transducer means for generating a signal representative of the positioning of said third element relative to a fixed third element reference.

5. The aircraft instrument of claim 4 wherein said first element is an aircraft heading card, said second element is an omni needle, and said third element is an autopilot command heading marker, said omni needle and said autopilot command heading marker being positionable by said means for coupling said second element and said means for coupling said third element, respectively, relative to said aircraft heading card.

6. The aircraft instrument of claims 2, 3 or 5 further comprising gear transmission means for coupling said gyro to said aircraft heading card.

7. The aircraft instrument as set forth in claim 4 wherein said means for de-coupling includes a clutch for coupling said third element to said first element, and means for energizing said clutch to disengage the coupling between the first element and the third element.

8. An aircraft instrument for generating navigation information comprising:
   (a) a frame;
   (b) an aircraft heading card mounted in said frame for rotation about a main axis;
   (c) a gyro supported in said frame behind said aircraft heading card having an outer gimbal disposed on a first axis;
   (d) gear drive means for coupling said gyro to said heading card, such that said heading card rotates with said gyro in a one-to-one relationship;
   (e) a heading transducer coupled to said gear drive means which generates a signal varying with the position of said heading card relative to said frame;
   (f) a navigation indicator mounted in said frame for rotation about said main axis;
   (g) a navigation indicator transducer coupled to said navigation indicator for generating a signal varying with the position of said navigation indicator relative to said frame; and
   (h) means for coupling said navigation indicator to said heading card for co-rotation, said coupling means including means for disengaging and relatively positioning said navigation indicator relative to said heading card such that the position of said navigation indicator relative to said heading card may be determined by sensing a differential between said heading transducer signal and said navigation indicator transducer signal.

9. The aircraft instrument of claim 8 wherein said coupling means includes a spring-loaded friction clutch such that during normal operation a high friction relationship exists between said heading card and said navigation indicator thereby causing co-rotation, and said navigation course selector means being operable to disengage said friction clutch to allow low-friction relative rotation between said heading card and said navigation indicator.

10. The aircraft instrument of claim 8 further comprising:
   (a) a heading marker disengagably coupled to said aircraft heading card for co-movement therewith; and
   (b) means for disengaging the heading marker from said aircraft heading card to vary the relative position therebetween.

11. The aircraft instrument as set forth in claim 10 wherein said means for disengaging includes a clutch for coupling said heading marker to said heading card, and means for energizing said clutch to disengage the coupling between the heading card and the heading marker.

12. A horizontal situation indicator for an aircraft, said indicator having a frame, a rotatable gyro-driven heading card, and a rotatable navigation indicator, and coupling means for disengaging and relatively positioning the navigation indicator relative to the heading card, comprising:
   (a) first signal generating means engaged with the heading card and providing an output varying with the heading card position relative the frame;
   (b) second signal generating means engaged with the navigation indicator and providing an output varying with the navigation indicator position relative the frame; and
   (c) means responsive to the differential between the output of said first and second signal generating means to indicate the relative position of said heading card with reference to said navigation indicator.

13. The horizontal situation indicator of claim 12 further comprising drive means for coupling said heading card to the gyro for synchronous movement and nonslippage therebetween.

14. The horizontal situation indicator of claim 13 further comprising selectively disengagable friction clutch means between said heading card and said navigation indicator disposed such that said setting means is operable to disengage said clutch means before setting force is applied to said navigation indicator.

15. The horizontal situation indicator of claim 12 further including an autopilot command heading marker mounted for co-movement with the heading card and further comprising:

means for disengageably coupling the command heading marker to the heading card for co-movement therewith;

means for moving the heading marker relative to the heading card when said heading marker has been disengaged from co-movement with said heading card; and third signal generating means for generating a signal representative of the position of the command heading marker relative to the frame.

16. The horizontal situation indicator as set forth in claim 15 wherein said means for disengagably coupling includes means for moving the heading marker relative to the heading card.

17. The horizontal situation indicator as set forth in claim 15 wherein said means for disengagably coupling includes a clutch for coupling the heading marker to the heading card, and means for energizing said clutch to disengage the coupling between the heading marker and the heading card.

* * * * *